June 19, 1956 W. H. WOOD 2,751,264
SELF-LUBRICATING JOURNAL PIN
Filed Jan. 21, 1954
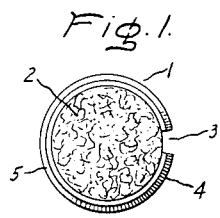
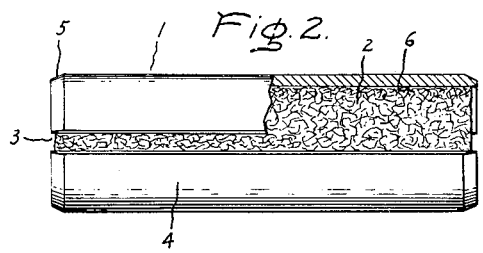
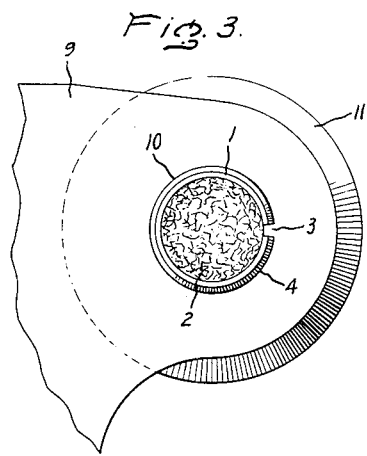
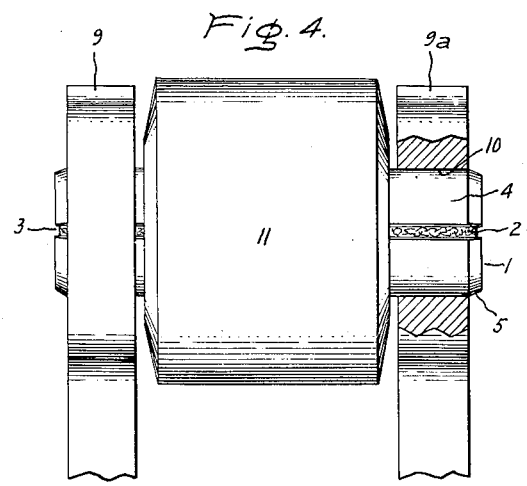
Inventor:
William H. Wood,
by
His Attorney.

United States Patent Office 2,751,264
Patented June 19, 1956

2,751,264

SELF-LUBRICATING JOURNAL PIN

William H. Wood, Wesleyville, Pa., assignor to General Electric Company, a corporation of New York Application January 21, 1954, Serial No. 405,366

1 Claim. (Cl. 308—104)

This invention relates to a self-lubricating journal pin to be used where the ordinary pin would be inaccessible or inconvenient for proper lubrication.

In many applications, journal pins of necessity are inaccessibly positioned and therefore, difficult to properly maintain. This results in their maintenance being improper in that they are, on the one hand, seldom lubricated, or, on the other hand, lubricant is spilled in the general area of the pin during the frequent lubrications. Spilled lubricant can be very damaging when the pin is used in conjunction with electrical devices causing damage to the local insulation. The practice of lubricating the pins at infrequent intervals often results in excessive wearing between the pin and the bearing so that the bearing is no longer true. Infrequent lubrication also may result in minute metal particles being ground or flaked off so as to foul the operation of the moving parts, the insulation, or the contacts of the electrical device. In many applications where extra lubrication is necessary, a grease or oil cup is positioned near the pin. This, of course, requires additional space which may not be readily available.

It is, therefore, an object of my invention to provide an improved self-lubricating journal pin.

It is a further object of my invention to provide a journal pin assembly that requires no securing means.

Further objects of my invention will become apparent from the following description of the particular embodiment thereof, illustrated in the accompanying drawings, while the scope of the invention is set forth in the appended claim.

Briefly, in accordance with my invention, I have provided a hollow cylindrical journal pin member fabricated from a rectangular piece of hard metal, such as spring steel. The journal pin casing, open at both ends, has a firm wicking material inserted therein. This wicking material is saturated with a lubricant. An opening of several thousandths of an inch in width running the length of the casing allows the lubricant to seep into the bearing surface area. The lubricant supply in the wicking material will be sufficient for a considerable time without additional lubrication. When it is desirable to lubricate the bearing again, the oiler merely adds oil to the wicking through one of the open ends of the bearing journal pin.

The pin is beveled at the ends so that it may be driven into an undersized pedestal bearing. This causes the casing to be compressed. As the casing is of a resilient metal, the journal pin is maintained in the proper position in the pedestal by friction.

The invention itself, both as to its structure and method of operation together with objects and advantages thereof, may best be understood by referring to the following description taken in conjunction with the accompanying drawings in which:

Fig. 1 is an end view of the self-lubricating journal pin;

Fig. 2 is a side view, partially cut away, of the pin shown in Fig. 1;

Fig. 3 shows one application with the journal pin of Fig. 1 partially compressed; and Fig. 4 is a side view, partially cut away, of the mechanism shown in Fig. 3.

Referring now to Figs. 1 and 2, I have shown the self-lubricating journal pin as having a metal casing 1 and a firm wicking 2 inserted therein. In order to support the bearing stresses involved, the pin 1 should be of a hard material, such as hardened steel. One example of a satisfactory material is spring steel having a Rockwell C40 or greater. Only with such a material is it feasible to have this type pin replace the conventional rivet without a considerable increase in the size of the bearing. It is suggested that the wicking may be of any material such as cotton or shredded textile fabric but firm felt has been found preferable.

To allow the lubricant placed in the wicking 2 to seep into the bearing surface area 4 for lubrication, a gap 3 is provided in the casing 1 of the pin. Thus, this gap 3 hydraulically connects the bearing surface area 4 to the wicking 2. To facilitate placing the journal pin in an undersized stationary pedestal bearing, a bevel 5 is provided at each end of the journal pin casing 1.

As shown in the cut-away portion of Fig. 2, the wicking material completely fills the reservoir 6 of the journal bearing pin. It is suggested that the wicking material be compressed when it is inserted in the casing 1 to insure its remaining within the hollow journal bearing pin under severe shock. The wick is cut 1/16" shorter than the pin to prevent the wicks on two parts mounted side by side from touching. Touching parts may start an arc-over.

Fig. 3 shows one application of the self-lubricating journal pin in a pedestal side 9. The pedestal may be of cast iron or any firm material to provide a forced fit between the pin and pedestal bearing. The bore 10 of the bearing opening is machined to a diameter slightly less than that of the free outer diameter of the casing 1. The movable member supported by the pin may be of any configuration, but the one shown in this particular embodiment is a roller 11. To allow unrestricted rotation, the inner bore of the movable member 11 should be of a diameter slightly larger than that of the bore 10.

The assembly of the bearing is accomplished by placing the assembled pin and wick against one side of the pedestal 9 with the bevel 5 partially inserted in the bore 10. The pin is then driven into the pedestal 9 until it protrudes slightly from the inner side of the pedestal. At this time, the movable bearing member 11 is positioned. Then the pin 1 is driven through the movable member 11 and into the pedestal member 9a. For proper assembly, the casing 1 should be long enough to extend slightly beyond both sides 9 and 9a of the pedestal.

In practice, it has been found that these self-lubricating journal pins may be utilized to replace rivets or solid pins of a length of from less than one inch to four inches using relatively thick spring steel on the order of .05" to .1" in thickness. A pin diameter on the order of .2" to .5" has been found satisfactory.

It is suggested that the unrestricted width of the gap 3 on this type of self-lubricating pin should be from .02" to .03". When the pin is compressed by insertion in the pedestal member 9, the gap 3 is on the order of .005". It is necessary that the gap 3 be at least .001" for the oil to seep from the wicking 2 to the bearing surface 4. However, having a larger gap allows greater tolerances and more economical construction. Having the gap as small as economical is advised for utilizing all of the bearing surface area possible.

In places where an oil or grease cup has been used and the quantity of lubricant required is not excessive, this journal bearing pin will permit eliminating these cups and thereby reduce the cost of the bearing member and the space required for the grease or oil cup.

It is suggested that this type of journal bearing pin should be used for hinge pins, support pins for rollers, pivot pins for arms and links and the like.

While I have shown a particular self-lubricating pin for carrying out my invention, there will be understood, of course, that I do not wish to be limited thereto since many modifications may be made; and I, therefore, aim by the appended claim to cover any such modification as fall within the true spirit and scope of my invention.

What I claim as new and desire to secure by Letters Patent of the United States is:

A bearing assembly comprising a hollow cylindrical journal pin having an inner surface substantially surrounding a reservoir and an outer bearing surface, said pin having an opening at one end communicating with said reservoir and having a longitudinal gap extending the length of said pin to thereby hydraulically connect said inner and outer surfaces, a pedestal bearing having two sides, each of said sides being provided with an aperture having an inner diameter slightly less than that of the free outer diameter of said pin to provide a forced fit between the ends of said pin and said bearing, a bevel on said outer surface of said pin at one end to facilitate assembling said pin in said bearing, a movable member pivotally mounted on said pin having an inner bore slightly larger than the diameter of said bearing to allow unrestricted rotation thereof, and a saturable wicking substantially filling said reservoir to retain lubricant therein.

References Cited in the file of this patent

UNITED STATES PATENTS

| | | |
|---|---|---|
| 95,716 | Nash | Oct. 12, 1869 |
| 124,618 | Paul | Mar. 12, 1872 |
| 1,433,095 | Peary | Oct. 14, 1922 |
| 1,728,433 | Mohun | Sept. 17, 1929 |

FOREIGN PATENTS

| | | |
|---|---|---|
| 3,343 | Great Britain | 1912 |